April 2, 1940.  C. BUCHNER  2,195,480
TANDEM DRIVE UNIT
Filed May 9, 1938  3 Sheets-Sheet 1
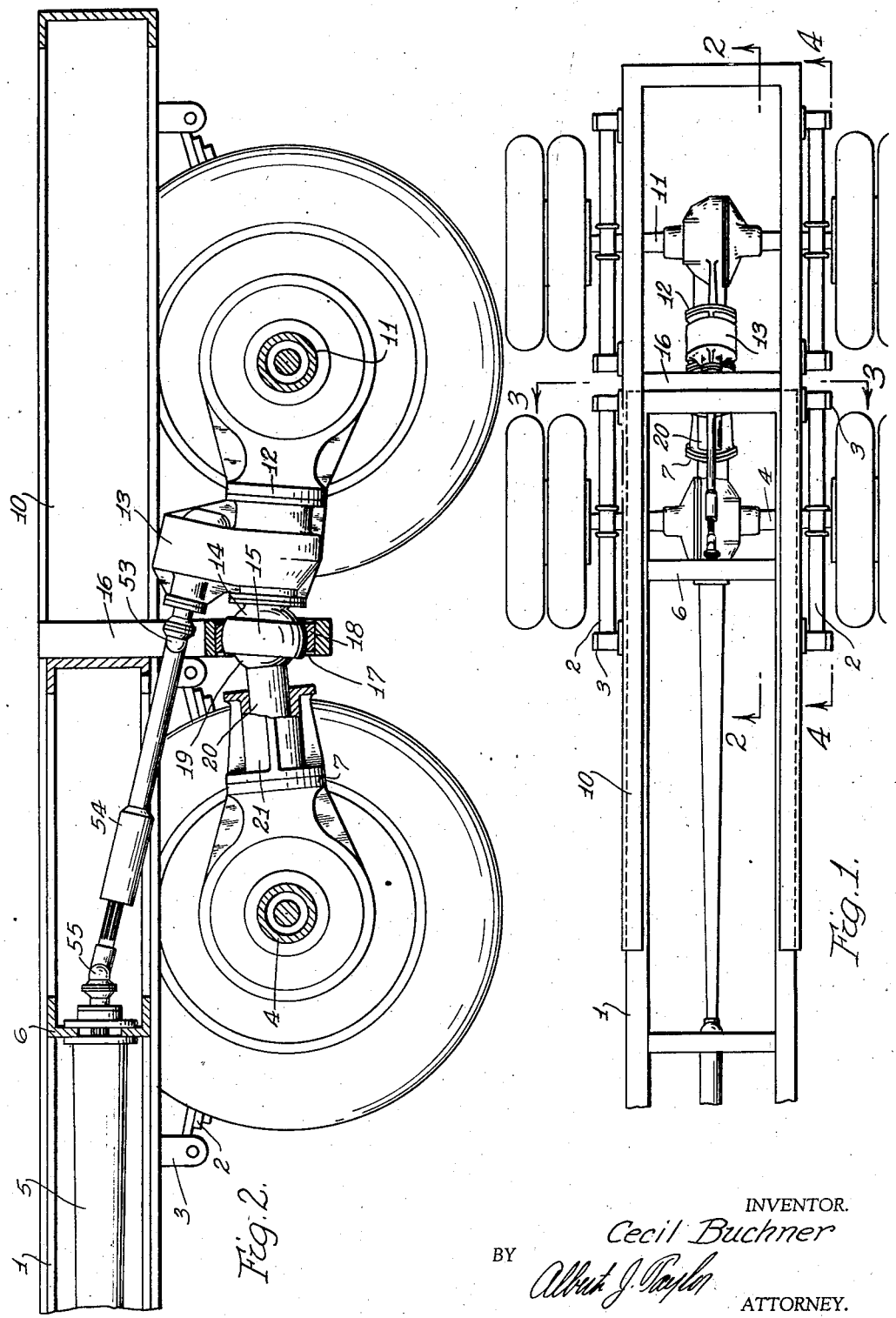
INVENTOR.
Cecil Buchner
BY
Albert J. Taylor
ATTORNEY.

April 2, 1940.                 C. BUCHNER                  2,195,480
                            TANDEM DRIVE UNIT
                           Filed May 9, 1938             3 Sheets-Sheet 2

INVENTOR.
Cecil Buchner
BY Albert J. Taylor
ATTORNEY.

April 2, 1940.   C. BUCHNER   2,195,480
TANDEM DRIVE UNIT
Filed May 9, 1938   3 Sheets-Sheet 3

INVENTOR.
Cecil Buchner
BY Albert J. Taylor
ATTORNEY.

Patented Apr. 2, 1940

2,195,480

UNITED STATES PATENT OFFICE 2,195,480

TANDEM DRIVE UNIT

Cecil Buchner, Detroit, Mich., assignor, by mesne assignments, to Alma Motor Company, Dover, Del., a corporation of Delaware Application May 9, 1938, Serial No. 206,804

7 Claims. (Cl. 180—22)

This invention relates to propelling means for motor vehicles and particularly concerns a conversion unit adapted to be permanently assembled upon the frame of a conventional automotive vehicle of the type embodying a single driving rear axle, for converting said vehicle into a vehicle having two rear driving axles in a tandem arrangement. The present conversion unit is, of course, also applicable to vehicles embodying a front driving axle in addition to the usual rear driving axle.

The primary object is to provide a conversion unit of the character above mentioned which may be readily assembled and secured upon a conventional automotive vehicle chassis, to provide the vehicle with an auxiliary driving axle in tandem relationship with the rear driving axle which is already present on the vehicle, without requiring any major changes in the existing vehicle construction. To this end a conversion unit is provided which comprises a sub-frame member constructed whereby it may be readily assembled upon and permanently secured to a conventional vehicle frame, to become a permanent part of the vehicle frame. The sub-frame member carries an auxiliary driving axle and a transfer gearing with a rearwardly extending power output operatively connected to the differential gearing in the auxiliary driving axle. The transfer gearing also has a forwardly directed power input member, adapted to be driven from the propeller shaft of the vehicle, and a forwardly extending power output adapted to be operatively connected to the differential gearing in the rear axle of the vehicle.

In conventional automotive vehicles the rear axle power input member is ordinarily directed forwardly, and is operated by a propeller shaft enclosed in a torque tube. Prior to assembly of the present conversion unit on the vehicle, the propeller shaft and the torque tube are disconnected from the rear axle and the rear axle is bodily rotated, about the axis of the wheels, so that its power input member extends rearwardly, for connection with the forwardly extending power output in the transfer gearing. However, it is to be noted that prior to shifting the rear axle in this manner, the forwardly directed power input member causes forward rotation of the wheels when rotated in a clockwise direction by the propeller shaft, and when the power input member is rearwardly disposed it causes forward rotation of the wheels when rotated in a counterclockwise direction. The direction of rotation of the power input of the rear axle is, in both cases referred to above, viewed from the front of the vehicle looking toward the rear. Accordingly, the auxiliary driving axle is arranged whereby the wheels thereon are rotated forwardly by a shaft rotating in counterclockwise direction, in order that it may be directly connected to the other axle.

The arrangement of the two driving axles above described results in the use of a minimum number of gears in the transfer gearing, which distributes power received from the propeller shaft to the two driving axles. With the propeller shaft rotating in a clockwise direction, and the axles arranged whereby their wheels are rotated forwardly by counter clockwise rotating driving members, it is possible to use a minimum plural number of gears in the transfer gearing. To be exact, two gears are all that are required which is an important feature inasmuch as it decreases frictional losses, results in low original cost, eliminates excessive maintenance costs, and avoids unnecessary weight.

Another object of the invention is to provide a conversion unit of the character above referred to wherein the auxiliary driving axle is of standard make. That is, in the case of a conversion unit for a Ford truck, for example, the auxiliary driving axle is a standard Ford truck rear axle. Being a standard rear axle, the wheels thereon ordinarily rotate forwardly when the power input member of the differential is rotated clockwise, whereas in the present arrangement the driving member for the two axles rotates counterclockwise. The auxiliary driving axle is, therefore, mounted upon the sub-frame in a reversed position, wherein the usual right hand wheel is disposed at the left hand side and vice versa.

Another object of the invention is to provide a tandem drive arrangement wherein the transfer gearing is enclosed in a housing which is directly mounted upon one of the axle housings, and which is supported in part by the vehicle frame. To this end, the transfer gearing housing has its free end universally mounted in a transverse frame member, and the driving connection between the two axles has a universal joint disposed within the universal mounting for the housing. Turning moments or torque reactions set up in the axle housings, as a result of driving and braking, are resisted by the transverse frame member, and under ordinary conditions the torque reactions in the two axles are equal and oppose each other at point of attachment to the transverse frame member.

In a vehicle having tandem driving axles there is the well recognized possibility that the wheels on one axle might rotate at a speed different from the speed of rotation of the wheels on the other axle. There are several reasons why such a condition might exist, for example, when the vehicle is travelling out of a straight line or over irregular surfaces, when the tires are partly deflated or deflected due to loading, or when the load shifts or the center of gravity changes. When this condition exists in an arrangement wherein the two driving axles are positively connected together to rotate in unison, torque accumulates in the driving connection between the two axles and causes what is commonly known as "propeller shaft windup." If this torque accumulation, which is entirely independent of the propelling torque transmitted to the two driving axles by the driving connection, exceeds the elastic limit of the shafting forming the driving connection, the tires must slip or destruction of the driving connection takes place. The presence of a differential gearing between the two axles relieves this condition insofar as "windup" and tire scuffage are concerned, but the differential has the well recognized disadvantage that if traction is lost at the wheels on one axle no driving torque is supplied to the wheels of the other axle.

Another object is to provide a tandem drive axle arrangement wherein the two axles are constantly connected together to rotate in unison, and which embodies a torque release device in the driving connection between the two axles designed to release any excessive accumulation of torque therein, and to avoid "windup" and tire scuffage resulting from conditions pointed out above. The torque release device, when driving conditions are normal, maintains a positive driving connection between the two axles, and when an excessive accumulation of torque takes place because the wheels on one axle rotate at a speed different from the wheels on the other axle, the device automatically releases the accumulation of torque, and substantially instantaneously with the release of the torque it re-establishes the positive driving connection. Due to the presence of this device driving torque is transmitted equally to both axles under normal conditions, and in the case of wheel slippage at either axle, torque will be transmitted to the other axle. This, of course, has a decided advantage over a conventional differential in that wheel slippage at either axle results in loss of driving effort at the other axle, and also that use of the torque release device, instead of a differential gearing eliminates considerable weight.

With the above and other ends in view the invention is hereinafter described with reference to the accompanying drawings, in which Fig. 1 is a fragmental plan view;

Figs. 2, 3 and 4 are sections taken respectively on the lines 2—2, 3—3 and 4—4 of Fig. 1;

Like characters of reference are employed throughout to designate corresponding parts.

Figure 3:
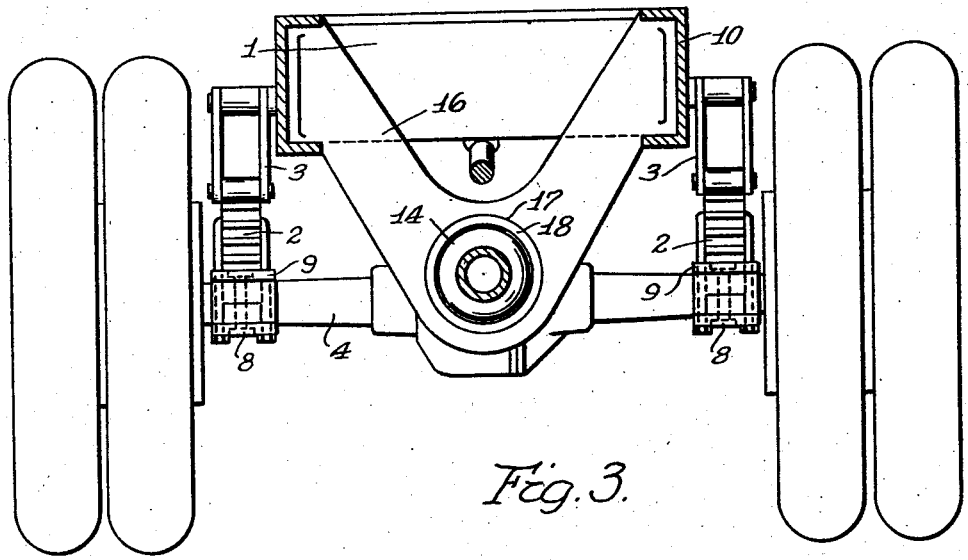
Figure 4:
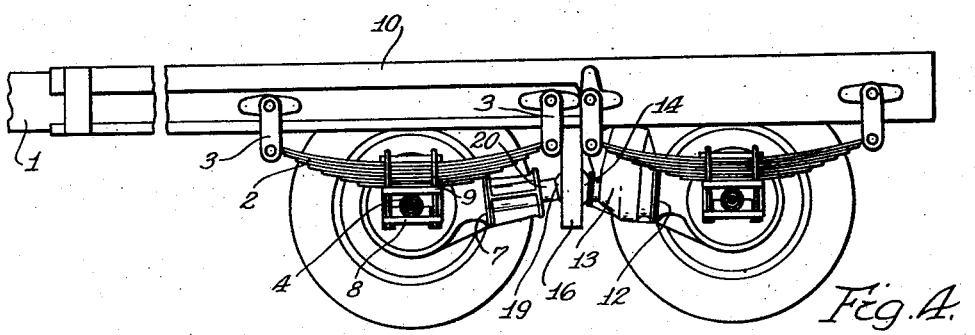

A fragment of a truck frame is illustrated at 1, and has the usual springs 2 connected thereto by shackles 3 for mounting a conventional rear axle 4 on the frame. The rear axle 4 is ordinarily driven by a propeller shaft enclosed in the torque tube 5, but in the present case the torque tube 5 and the propeller shaft which it encloses are disconnected from the rear axle 4 and are supported in an elevated position by a transverse frame member 6. The frame member 6 is added to the vehicle frame 1 for the purpose of supporting the torque tube 5 and the enclosed propeller shaft.

Prior to assembly of the conversion unit on the vehicle, the springs 2 are disconnected from the rear axle housing 4 and the latter is rotated about the axis of the wheels thereon so that the portion 7, which formerly extended forwardly and had the torque tube 5 connected thereto, extends rearwardly. Conventional rear axle housings usually have a spring perch 8 formed integral therewith, and when the axle housing is reversed the spring perch becomes disposed beneath the housing instead of on top. Therefore, auxiliary perchs 9 are secured to the axle housing and the springs 2 are secured thereto in the usual manner.

Figure 5:
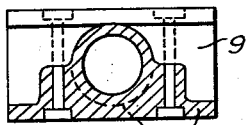
Fig. 5 is a section illustrating a detail.

After the truck arrangement is modified as above described, the conversion unit is assembled on the frame 1 and permanently secured thereto. To readily permit assembly, the conversion unit is formed with a sub-frame 10 adapted to be slipped onto the frame 1 and secured thereto, as by welding. Attached to the sub-frame 10 is a standard rear axle assembly 11, hereinafter termed the auxiliary driving axle. The auxiliary axle is of standard make, identical to that on the truck to be converted, and in order to provide a proper driving relationship, as is hereinafter described more in detail, the auxiliary axle is reversed. That is, the auxiliary axle is upside down and is bodily swung around so that the wheel normally disposed at the right hand side is disposed at the left hand side. To permit this arrangement auxiliary spring perches, identical to that shown at 9 in Fig. 5, are employed.

The auxiliary axle 10 has a portion 12 to which a torque tube would ordinarily be connected in a normal truck arrangement. In the instant case, however, a gear housing 13 is secured to the portion 12, and contains transfer gearing and a torque release device. The unsupported end of the housing 13 has a hollow spherical member 14 secured thereto and an external spherical bearing surface 15 is rigidly supported by the spherical member 14. A transverse frame member 16 is secured to the sub-frame 10 and has a bore 17 in which is slidably mounted a bearing member 18. The bearing 18 has an internal spherical surface contacting the spherical surface 15, and supporting part of the weight of the housing 13. The housing 13, being rigidly secured to the axle housing 11, and being supported in the transverse frame member 16, resists the torque reactions set up in the axle 11 as a result of driving or braking.

In order that the transverse member 16 may also resist the torque reactions set up in the axle 4, a spherical member 19 is mounted within the spherical member 14 and has a hollow stem 20 slidably received within a rigid element 21, which is attached to the rear axle 4.

The housing 13 is provided with a bearing seat 22 in which the outer race member 23 of a combined radial and end thrust bearing is locked by a removable locking member 24. The inner race member 25 is locked upon the axial stem 26 of a bevelled gear 27 by a removable element 28. The gear 27 is thus supported for rotation and is held against endwise movement. The stem 26, which is integral with the gear 27, has an internally splined bore 29 receiving one end of a splined shaft 30 which extends to the power input member of the differential contained in the auxiliary axle housing 11.

The gear 27 has an axial bore 31 extending into the plane of the bearing 22—25, and receives roller bearings 32 for rotatably supporting a shaft 33. At its other end the shaft 33 is supported by a bearing 34 whose inner race member is fixed with respect to the shaft 33 and whose outer race member is fixed with respect to the housing 13. The inner race of the bearing 34 is clamped against a shoulder 35 on the shaft 33 by a part 36 of a universal joint 37, which is secured upon a splined portion 38 of the shaft 33 by a nut 39. The outer race of the bearing 34 is clamped between a shoulder 40 in the housing 13 and the base portion 41 of the spherical member 14. Although not illustrated, it will be understood that the base portion 41 is secured to the housing 13 by bolts.

Figure 8:
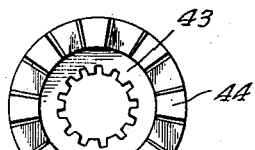
Figs. 8 and 9 are elevations of a part of the torque release device.
Figure 9:
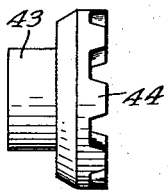
Figure 10:
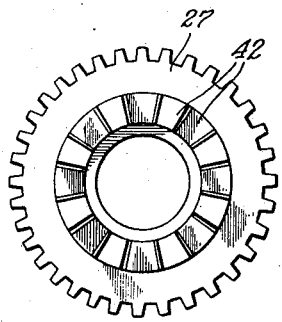
Figs. 10 and 11 are elevations of another part of the torque release device.
Figure 11:
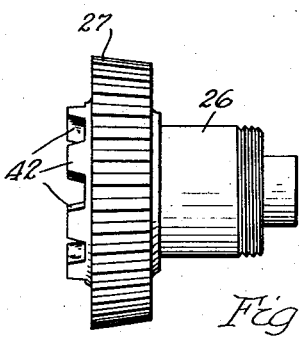

As may be readily seen upon reference to Figs. 10 and 11, the gear 27 is provided with angular sided jaw clutch teeth 42, and a clutch member 43, shown in detail in Figs. 8 and 9, has similar angular sided jaw clutch teeth 44. The clutch element 43 is slidably mounted on a splined portion 45 of the shaft 33 and its jaw teeth are normally held in contact with the jaw clutch teeth 42 by a spring 46. An annular element 43a is disposed between the clutch element 43 and the gear 27 and prevents frictional binding of the jaw teeth as a result of wedging.

An internally splined member 47 is connected to the universal joint 37 and receives the end of a splined shaft 48 which is connected in the usual manner to the differential gearing in the axle 4. It becomes apparent, therefore, that a positive driving connection is present between the two shafts 30 and 48, under normal conditions. However, when the wheels on one axle rotate at a speed different from the wheels on the other axle, there is a tendency for the driving connection to "windup," due to an accumulation of torque in said driving connection. When the torque accumulation becomes great enough, the angular sided jaw clutch teeth separate and release the torque accumulation. The driving connection between the two shafts 30 and 48 is thus momentarily broken, and the spring 46 returns the clutch member 43 to operative relationship with the jaw teeth 42 substantially instantaneously with the release of the excess torque.

Rotatably supported in the housing 13 is a shaft 49, supported at one end in anti-friction bearings 50, and at its other end by a combined radial and end thrust bearing 51. Rotatable with the shaft 49 is a bevelled gear 52 which meshes with the bevelled gear 27. The shaft 49 is connected by a universal joint 53 to an extensible shaft 54, which is connected at its other end by a universal joint 55 to the propeller shaft in the torque tube 5.

Figure 6:
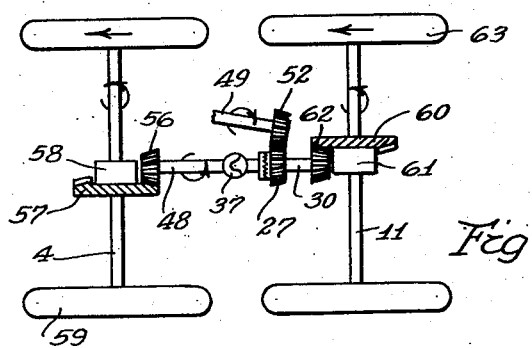
Fig. 6 is a diagram of the drive axle arrangement.
Figure 7:
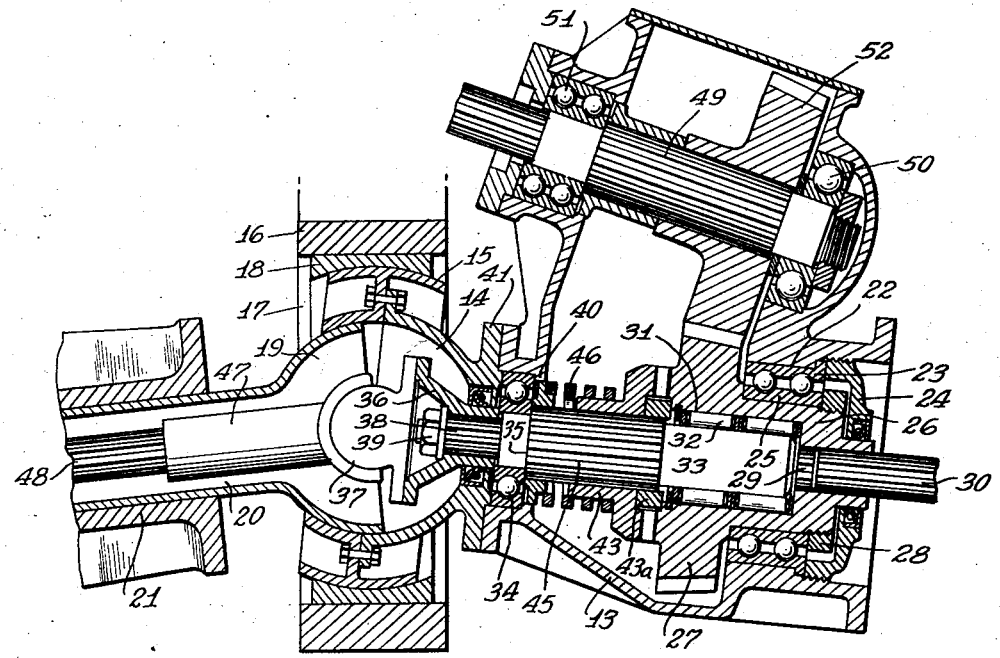
Fig. 7 is a vertical section of the transfer gearing.

As may be seen upon reference to Fig. 6, the shaft 49 will be rotated in a clockwise direction, and the shafts 30 and 48 will be rotated counterclockwise, as viewed from the front of the vehicle. The gear 56 on the shaft 48 meshes with the main gear 57 of the differential 58 to rotate the wheels 59 on the axle 4 in a forward direction, with the differential 58 rotated about the axis of the wheels so that the power input gear 56 is disposed to the rear instead of its usual position in front of the axle 4. The auxiliary axle 11 has the main gear 60 of its differential 61 driven by a gear 62 on the shaft 30, and this axle is reversed by swinging it around so that its right hand wheel becomes disposed at the left hand side. This disposition of the axle 11 provides for rotation of the wheels 63 forwardly upon counterclockwise rotation of the shaft 30.

With the arrangement above described, the transverse frame member 16 is proportioned so that the center of the universal joint 37 is in a horizontal plane higher than the axes of the axles 4 and 11, when the vehicle is unloaded. This, of course, results in a normal angular condition in the universal joint, but the angularity in the joint decreases as the load is increased. This permits a universal joint arrangement wherein angular conditions in the universal joint are most favorable when the vehicle is loaded.

From the foregoing it becomes apparent that the present conversion means may be assembled and shipped as a unit and may be assembled upon a conventional vehicle by garage mechanics. In other words, it is not necessary to transport the vehicle to be converted to the factory manufacturing the unit, which is ordinarily necessary in view of the major changes required in the existing vehicle structure to accommodate a tandem drive arrangement. A further advantage is present in that all of the parts of the existing vehicle are utilized in driving the conversion unit.

Although a specific embodiment of the invention has been illustrated and described, it will be understood that various changes may be made within the scope of the appended claims without departing from the spirit of the invention, and such changes are contemplated.

What I claim is:

1. A conversion unit of the character described, comprising a sub-frame adapted to be secured to the frame of a motor vehicle having a driving rear axle, a drive axle and a transfer gearing on the sub-frame, said transfer gearing having a power input adapted to be connected to the motor of the vehicle, said transfer gearing also having two power outputs, one of said power outputs being adapted to be connected to the driving axle of the vehicle when said sub-frame is assembled on the frame of the vehicle, and means operatively connecting the other power output to said drive axle.

2. A conversion unit of the character described, comprising a sub-frame adapted to be attached to the frame of a motor vehicle, a driving axle on said sub-frame adapted to be positioned in spaced relation to the usual rear axle of the vehicle upon attachment of the sub-frame to the vehicle frame, a transfer gearing on the sub-frame and adapted to be positioned between said driving axle and the vehicle rear axle upon attachment of the sub-frame to the vehicle frame, said transfer gearing having a power input, said transfer gearing also having two oppositely disposed power outputs, one of said power outputs being adapted to be connected to the rear axle of the vehicle, and means connecting the other power output to said driving axle.

3. A conversion unit of the character described, comprising a sub-frame adapted to be attached to the frame of a motor vehicle, a driving axle on said sub-frame adapted to be positioned in spaced relation to the rear of the usual rear drive axle of the vehicle upon attachment of the sub-frame to the vehicle frame, a transfer gearing mounted upon said sub-frame and adapted to be supported between said driving axle and the rear axle of the vehicle upon attachment of the sub-frame to the vehicle frame, said transfer gearing having a forwardly directed power input, said transfer gearing also having a forwardly extending power output and a rearwardly extending power output, said forwardly extending power output being adapted to be connected to the rear drive axle of the vehicle, and means connecting the rearwardly extending power output to said driving axle.

4. In an automotive vehicle having a frame and a pair of driving axles arranged with their power inputs facing each other and attached to said frame by springs, a transfer gearing housing having one end rigidly attached to one axle, universally pivoting means connecting the other end of said housing to said frame, lengthwise extensible inflexible means rigidly connected to the other axle and to said frame by universally pivoting means having its center coincident with the center of the first universally pivoting means, transfer gearing in said housing and operatively connected to the axle upon which said housing is mounted, and means including a universal joint having its center coincident with the center of the universally pivoting means for connecting said transfer gearing with the other axle.

5. In an automotive vehicle having a frame and a pair of driving axles arranged with their power inputs facing each other and attached to said frame by springs, a transfer gearing housing having one end rigidly attached to one axle, universally pivoting means connecting the other end of said housing to said frame, lengthwise extensible inflexible means rigidly connected to the other axle and to said frame by universally pivoting means having its center coincident with the center of the first universally pivoting means, a bevelled gear in said housing, means connecting said gear with the axle upon which said housing is mounted, means including a universal joint disposed with its center coincident with the center of said universally pivoting means for connecting said gear with the other axle, and a bevelled gear in said housing meshing with the first gear and adapted to be connected to a power supply member.

6. In an automotive vehicle having a frame and a pair of driving axles arranged with their power inputs facing each other and attached to said frame by springs, a transfer gearing housing having one end rigidly attached to one axle, universally pivoting means connecting the other end of said housing to said frame, lengthwise extensible inflexible means rigidly connected to the other axle and to said frame by universally pivoting means having its center coincident with the center of the first universally pivoting means, transfer gearing in said housing and operatively connected to the axle upon which said housing is mounted, and means including a universal joint having its center coincident with the center of the universally pivoting means for connecting said transfer gearing with the other axle, said last named means including means for preventing an excessive accumulation of torque when the wheels on one axle rotate at a speed different from the wheels on the other axle.

7. In combination, a vehicle having a frame and a propeller shaft, means on said frame supporting the free end of said propeller shaft, a pair of drive axles arranged with their power inputs facing each other and secured to said frame by springs, a transfer gearing housing having one end rigidly attached to one axle, universally pivoting means connecting the other end of said housing to said frame, lengthwise extensible inflexible means rigidly connected to the other axle and to the frame by universally pivoting means having its center coincident with the center of the first universally pivoting means, a gear in said housing operatively connected to the axle upon which the housing is mounted, means including a universal joint disposed with its center coincident with the center of said universally pivoting means for operatively connecting said gear with the other axle, and means for rotating said gear, said means including a gear and a lengthwise extensible member universally connected to said propeller shaft and the last named gear.

CECIL BUCHNER.